Dec. 14, 1954

A. S. KNAPP ET AL 2,697,164

FAN THERMOSTAT FOR ELECTRIC HEATERS

Filed May 31, 1952

Inventors.
Andrew S. Knapp.
Charles D. Visos.
By Bair, Freeman & Molinare
Attys.

Dec. 14, 1954 — A. S. KNAPP ET AL — 2,697,164
FAN THERMOSTAT FOR ELECTRIC HEATERS
Filed May 31, 1952 — 2 Sheets-Sheet 2
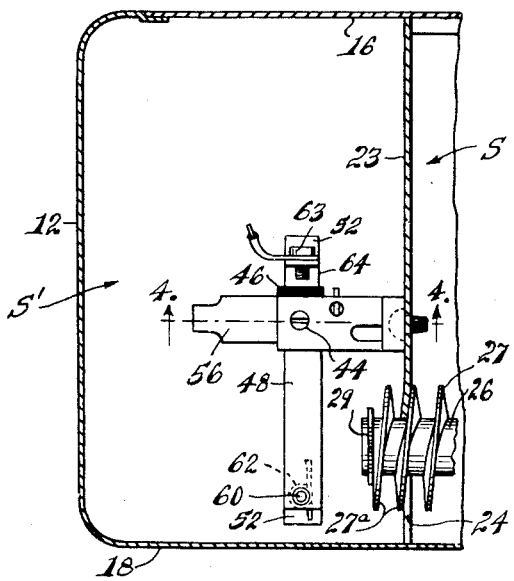
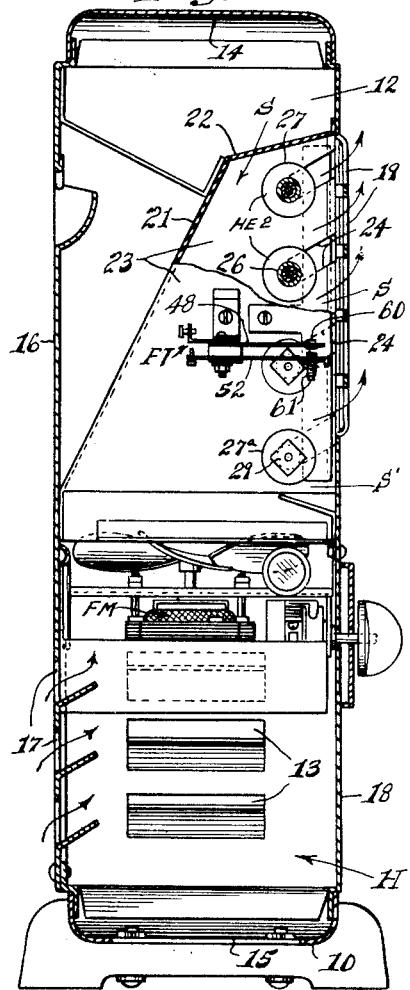
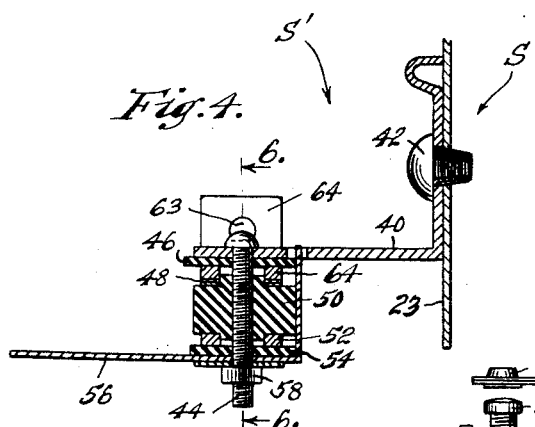
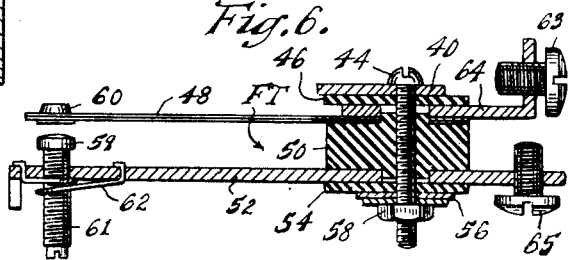
Inventors.
Andrew S. Knapp.
Charles D. Visos.
By Bair, Freeman & Molinare
Att'ys.

United States Patent Office 2,697,164
Patented Dec. 14, 1954

2,697,164

FAN THERMOSTAT FOR ELECTRIC HEATERS

Andrew S. Knapp and Charles D. Visos, St. Louis, Mo., assignors to Knapp-Monarch Company, St. Louis, Mo., a corporation of Delaware Application May 31, 1952, Serial No. 290,882

7 Claims. (Cl. 219—39)

This invention relates to a thermostat for controlling the air circulating fan in an electric heater of the type shown in Pass Patent No. 2,562,436.

One object of the invention is to provide a thermostat which prevents the fan from circulating air that has not been heated above room temperature and therefore feels cold or "drafty." In an electric room heater provided with a fan for circulating the air, it has been our experience that during about the first five minutes of operation, the fan will circulate cold air or at least the draft from the fan will seem to be cold before the heating elements have had time to become heated throughout their entirety and therefore have not attained a stable temperature. It is desirable, therefore, when the user turns on both the heating element and the fan, to delay the energization of the fan until this stable temperature is reached.

An important object, therefore, of our present invention is to provide a thermostat so designed and so located with respect to other elements of a room heater or the like that it will perform this desirable function without attention by the user of the appliance.

Another object is to provide a thermostat which responds to the heat generated in the room heater and closes only when the temperature has been raised to a desirable degree sufficient to heat substantially all the air that is circulated by the fan of the appliance.

A further object is to provide a thermostat which will perform this function without recycling as a result of being cooled down by the air from the fan after the thermostat turns it on, the specific arrangement being such that the thermostat is located to receive sufficient heat from the heating elements of the appliance to close the same and keep it closed once the appliance has reached a stable operating temperature without being affected by the air that is circulated by the fan when it is energized.

Still a further object is to provide a room heater in which there is an air circulating compartment with the heating elements mounted therein and a second compartment in which the thermostat is located, portions of the heating elements, however, extending into the second compartment for furnishing the necessary heat to make the thermostat respond properly without being cooled by the air that is forced through the air circulating compartment by the fan.

With these and other objects in view, our invention consists in the construction, arrangement and combination of the various parts of our fan thermostat for electric heater, whereby the objects contemplated are attained, as hereinafter more fully set forth, pointed out in our claims and illustrated in the accompanying drawings, wherein:

Figure 1 is a vertical sectional view through a room heater of the type shown in the Pass patent and showing our thermostat mounted in conjunction therewith.

Figure 2 is an electric diagram of the heating elements, the fan motor, the thermostat and a manual control switch for the room heater.

Figure 3 is an enlarged horizontal sectional view on the line 3—3 of Figure 1 showing details of the location of the thermostat with respect to other elements of the room heater.

Figure 4 is an enlarged detail sectional view on the line 4—4 of Figure 3.

Figure 5 is an enlarged vertical sectional view on the line 5—5 of Figure 1; and Figure 6 is a detail sectional view on the line 6—6 of Figure 4.

On the accompanying drawings I have used the reference character H to indicate in general a housing of a room heater. The housing H has a bottom wall 10, end walls 12, a top wall 14, a back wall 16 and a front wall 18. The ends 12 are provided with louvered air inlet openings 13. The back wall 16 is provided with louvered air openings 17, the bottom 10 is provided with air inlet openings 15 and the front wall 18 is provided with air outlet openings 19 (see particularly Figure 5).

Within the housing H an air circulating space S is provided and this is defined by sheet metal walls formed into a sloping back 21, a sloping top 22 and ends 23. The ends 23 divide the housing H so that compartments S' and S" are formed beyond the centrally located compartment S and serve as supports for heating elements HE¹ and HE², two of each being provided. Each heating element consists of a metal tube 26 having fins 27 and within the tubes are suitably insulated resistance wires R¹ and R² shown diagrammatically in Figure 2. The ends of these wires extend out of insulators 29 in the ends of the tubes but the wiring is not illustrated in Figure 1. The tubes adjacent their ends are received in notches 24 of the end members 23 whereby the heating elements are supported.

A fan motor FM is provided with fan blades 30 for circulating the air upwardly through the air circulating space S, drawing it in through the openings 15, 13 and 17 and discharging it through the openings 19. A suitable switching arrangement is provided for the fan motor and the heating element and is shown in Figure 2, a switch blade 32 being provided for the fan motor and switch blades 34 and 36 being provided for the resistance wires R¹ and R² respectively. A pilot lamp 38 may be provided to indicate energization of the resistance wire R¹ and the lamp may be of low voltage in which case it is shunted by a resistor 39 to provide the desired voltage drop to match the voltage requirements of the lamp.

In the circuit of the fan motor FM, we provide a fan thermostat FT. Without this thermostat the usual switching arrangement is one in which switch blade 34 only may be closed for energizing only the resistance wire R¹ for generation of heat only by the heating elements HE¹ in one position of the switch. In another position, both 32 and 34 are closed for also energizing the fan motor FM. In a third position, all three switch blades 32, 34 and 36 are closed for energizing the fan motor and all of the resistance wires R¹ and R² for providing "high" heat.

In either of the last two positions of the switch, the initial operation of the room heater results in the fan 30 circulating air that has not yet been properly heated and we therefore provide the fan thermostat FT in circuit with the fan motor and the switch 32, the fan thermostat being normally open. It closes only upon sufficient temperature rise of the heating elements HE¹ (or both heating elements HE¹ and HE²) to insure that the circulation of air will not commence until sufficient heat has been generated to bring the heating element parts up to a stable operating temperature without appreciable drop in that temperature when the fan commences to operate.

We provide a fan thermostat comprising a bracket 40 of metal attached by a bolt or rivet 42 to one of the walls 23. The bracket 40 carries a bolt 44 on which is stacked an insulating washer 46, a bimetal blade 48, an insulating bushing 50, a contact blade 52, another insulating washer 54 and a switch guide strip 56. These elements are retained by a nut 58.

Contacts 59 and 60 are carried by the strip 52 and the bimetal 48 respectively, and the contact 59 is adjustable, being mounted on a screw 61 threaded in the blade 52. A friction wire 62 retains the adjustment. Terminal screws 63 and 65 are carried by a bracket 64 contacting with the bimetal 48 and by the blade 52 for circuit connections.

The location of the fan thermostat FT is of considerable importance. If located within the air circulating space S, the fan, when it commences to operate due to warping of the bimetal 48 closing the contacts 59 and 60, will immediately cause the contacts to open again and several recyclings of the fan will occur before the thermostat will remain closed and keep the fan operating. By having the thermostat in a compartment of the housing H outside of the air circulating space S, it is out of the flow of the circulated air and therefore is not cooled by the air that is circulated by the fan when it does operate.

Also, by having limited extensions of the heating elements outside of the space S, specifically about two of the fins indicated at 27a outside the ends 23 of the air circulating space, sufficient heat is radiated to the thermostat and also conducted to it through the end wall 23 and the bracket 40 to operate it approximately five minutes after the heating element HE¹ is energized when the contacts 59 and 60 are adjusted for a separation of about 1/32" at normal room temperature. The arrangement disclosed results in insuring that the thermostat will close about the proper time and will stay closed without recycling once it is closed.

There is a small amount of heat supplied to the compartment S¹ in which the thermostat is mounted, due particularly to the heating of the air therein by the fins 27a but there is substantially no air circulation caused by the operation of the fan. By having the thermostat above the heating elements HE¹, it will respond properly to the energization thereof even when the heating elements HE² are not energized. The arrangement is such that when the heating elements HE² are also energized, additional heat will be generated in the fins 27a of these heating elements and additional heat will be conducted by the wall 23 to the thermostat FT for causing it to operate (close the fan motor circuit) in a shorter period of time, thus responding properly to the energization of one or both sets of heating elements, depending on the setting of the control switch. The arrangement disclosed has been found very satisfactory in controlling the fan motor FM in the desired manner.

We have disclosed a thermostat which delays energization of the fan of a room heater until the heating elements have reached stable operating temperature. By having the contacts separated a slight distance at normal room temperature, the fan motor is not energized when the appliance is cold and energization occurs only after it has heated up an amount which insures comfort for the user. The location of the thermostat also is such as to avoid any recycling tendency when the fan is energized.

We found that it was not possible to place the thermostat at certain locations in the appliance. When located near the heating elements and in the path of the circulating air, the action of the fan when finally energized after a period of delay would cause the thermostat to cool off sufficiently to again de-energize the fan. The problem was, therefore, to prevent intermittently energization and de-energization of the fan after the heating elements become hot as this is undesirable since we proposed only to initially delay the fan action until the heating elements had come up to temperature. The final solution was to place the thermostat in a particular location and so mount it that a particular combination of conducted and radiated heat reaches the thermostat to provide the proper initial delay and yet prevents subsequent recycling. Under normal conditions it requires a temperature of about 150° F. at the thermostat before the heating elements are at a suitable temperature for operation of the fan and the contact spacing indicated accomplished the desired sequence of operations.

Some changes may be made in the construction and arrangement of the parts of our fan thermostat for electric heater without departing from the real spirit and purpose of our invention, and it is our intention to cover by our claims any modified forms of structure or use of mechanical equivalents which may be reasonably included within their scope.

We claim as our invention:

1. In a room heater, the combination of a housing, heating means therein, walls within said housing defining an air circulating space past said heating means, an electric fan for circulating air through said space, a thermostat mounted on one of said walls within said housing but outside said space, said thermostat being open at normal room temperature and connected in series with said fan to energize the fan only when said heating means has attained a temperature sufficiently high to heat substantially all the air circulated by the fan to above normal room temperature.

2. In a room heater, the combination of a housing, heating means therein, walls within said housing defining an air circulating space past said heating means, said housing having a cold air inlet opening adjacent the bottom thereof and a hot air discharge opening adjacent the top thereof, both communicating with said space, an electric fan for drawing air in through said cold air inlet opening, circulating it through said space and discharging it from said hot air discharge opening, and a thermostat for said fan mounted on one of said walls within said housing but outside said space, said thermostat being connected in series with said fan to energize the fan only when said heating means has attained a stable operating temperature.

3. In a room heater, the combination of a housing, heating means therein, an air circulating space therein around said heating means, an electric fan for circulating air through said space, and a thermostat mounted within said housing but outside said space, said thermostat being connected in series with said fan to energize the fan only when said heating means has attained a stable operating temperature.

4. A room heater comprising a housing having an air circulating compartment provided with inlet and outlet openings, an electric fan for circulating air through said compartment of said housing, a second compartment in said housing, a metal wall separating said second compartment from said air circulating compartment, heating means within said air circulating compartment and extending to a limited extent into said second compartment, and a thermostat for controlling energization of said fan mounted on said wall within said second compartment, said thermostat being open at normal room temperatures and closed in response to heat conducted thereto from said wall and to the heat of the extensions of said heating means within said second compartment.

5. A room heater comprising a housing having an air circulating compartment provided with inlet and outlet openings, an electric fan for circulating air through said compartment, a second compartment in said housing, a wall separating said second compartment from said air circulating compartment, heating means within said air circulating compartment and extending to a limited extent into said second compartment, and a thermostat for controlling energization of said fan mounted in said second compartment, said thermostat responding to heat of the extensions of said heating means within said second compartment.

6. A room heater comprising a housing having an air circulating compartment provided with inlet and outlet openings, an electric fan for circulating air through said compartment of said housing, a second compartment in said housing, a metal wall separating said second compartment from said air circulating compartment, heating means within said air circulating compartment, and a thermostat for controlling energization of said fan mounted on said wall within said second compartment, said thermostat being open at normal room temperatures and closed in response to heat conducted thereto from said wall.

7. A room heater comprising a housing having an air circulating compartment, an electric fan for circulating air through said compartment, a second compartment in said housing, a wall separating said second compartment from said air circulating compartment, heating means within said air circulating compartment and extending to a limited extent into said second compartment, and a thermostat for controlling energization of said fan mounted on said wall within said second compartment.

References Cited in the file of this patent

UNITED STATES PATENTS

| Number | Name | Date |
|---|---|---|
| 2,203,425 | Welch | June 4, 1940 |
| 2,244,172 | Novak | June 3, 1941 |
| 2,360,071 | Noll | Oct. 10, 1944 |
| 2,492,774 | Wild | Dec. 27, 1949 |